W. E. HARRIS.

METHOD OF UTILIZING WASTE HOOP IRON.

No. 10,620. Reissued July 7, 1885.

Attest;
Charles Pickles
Geo. L. Wheelock

Inventor;
William E. Harris
By Knight Bros
Attys

BELL BROS., PHOTO-LITHOGRAPHERS, WASHINGTON, D. C.

UNITED STATES PATENT OFFICE.

WILLIAM E. HARRIS, OF ST. LOUIS, MISSOURI.

METHOD OF UTILIZING WASTE HOOP-IRON.

SPECIFICATION forming part of Reissued Letters Patent No. 10,620, dated July 7, 1885.

Original No. 314,378, dated March 24, 1885. Application for reissue filed April 25, 1885.

*To all whom it may concern:*

Be it known that I, WILLIAM E. HARRIS, of the city of St. Louis, in the State of Missouri, have invented a certain new and useful Improvement in Utilizing Waste Hoop-Iron, &c., of which the following is a full, clear, and exact description, reference being had to the accompanying drawings, forming part of this specification, and in which—

Figure 1:
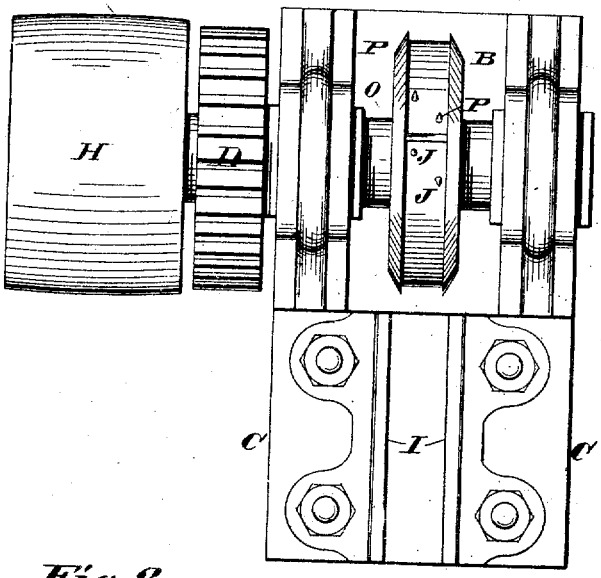
Figure 3:
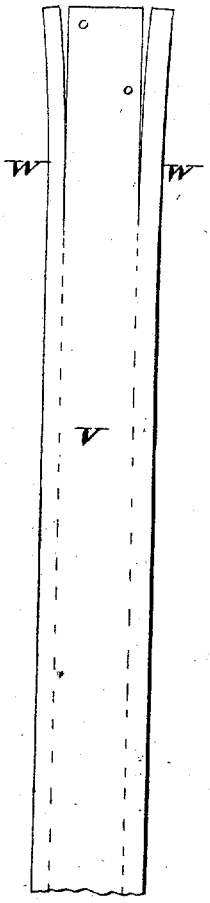
Figure 2:
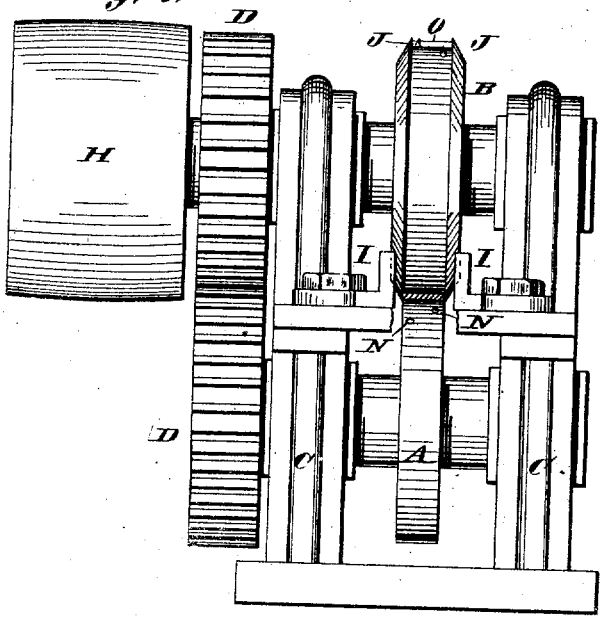
Figure 2:
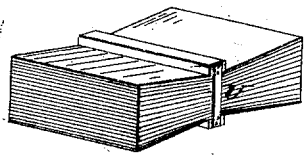

Figure 1 is a top view of the machine. Fig. 2 is a front view, and Figs. 3 and 4 views of the product.

My invention consists in utilizing waste or refuse hoop-iron—such as cotton-bale ties that have been used and are worthless unless melted and put into a new form—by passing it through rolls to reduce it in thickness and width, and then cutting it into lengths about twelve inches long and perforating the ends, to be used in bunching shingles—that is, for connecting the cross-strips by which a number of shingles are held together—as shown in the diagram at the bottom of the drawings. This scrap hoop-iron can be purchased very cheap, and with a small expense can be passed through rolls to reduce it to the proper thickness and width to perforate and cut it off, and in this condition it brings a good price and has ready sale.

Referring to the drawings, I will describe one form of machine for carrying out my invention.

Figure 4:
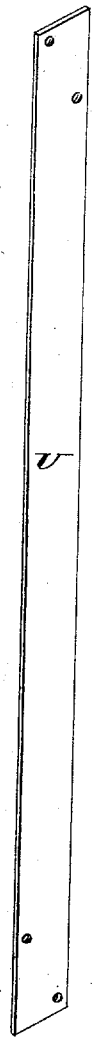

A represents a lower plain roll, and B an upper flanged roll, supported in a suitable frame, C, and connected by gear-wheels D. On the shaft of one of the rolls is a driving-pulley, H. The metal is first heated and then fed to these rolls between guides I, and is reduced by the rollers to the proper thickness by being pressed between the rollers, and to the proper width by being cut by the sharp flanges of the upper roller, and is then perforated by pins or projections J on the upper roller which enter recesses N in the under roller, and then the strip is cut off by a transverse knife, O, on one of the rollers, and immediately behind this knife are pins P for perforating the first end of the next strip, so that both ends are perforated, as shown in Fig. 4. This finished strip is lettered U, and V represents a piece of the hoop-iron before treatment, except the upper end, Fig. 3, which is shown as having been treated.

The sides W, which are cut off to make the strip the proper width, are worth as much for scrap, to be melted up, as the hoop-iron itself.

These strips for binding have been heretofore made from good and valuable wrought-iron strips, which have to be perforated and cut in a manner very similar to that above described, so that the cost of producing them is about or just the same, while the first cost of the material is several times as much as the scrap hoop-iron used in my improved method.

I claim as my invention—

1. The method herein described of utilizing waste or scrap hoop-iron, &c., which consists in passing it through rolls to reduce it, then perforating it and cutting it into proper lengths for binding shingles, as set forth.

2. The method herein described of utilizing waste or scrap hoop-iron, &c., which consists in passing it in a hot condition through rolls to reduce it to the proper thickness and width, then perforating it and cutting it into proper lengths for binding shingles, as set forth.

WILLIAM E. HARRIS.

In presence of—
GEO. H. KNIGHT,
SAML. KNIGHT.